US006653824B1

(12) United States Patent
Whitlock

(10) Patent No.: US 6,653,824 B1
(45) Date of Patent: Nov. 25, 2003

(54) CONTINUOUS FEED-FORWARD AC VOLTAGE REGULATOR

(75) Inventor: William Whitlock, Sherman Oaks, CA (US)

(73) Assignee: Atlantis Power Quality Systems, Inc., Chatsworth, CA (US)

( * ) Notice: Subject to any disclaimer, the term of this patent is extended or adjusted under 35 U.S.C. 154(b) by 0 days.

(21) Appl. No.: 09/211,915

(22) Filed: Dec. 15, 1998

(51) Int. Cl.[7] .......................... G05B 34/02

(52) U.S. Cl. .......................... 323/344

(58) Field of Search .......................... 323/273, 280, 323/282, 285, 328, 344; 363/65, 74, 75, 78

(56) References Cited

U.S. PATENT DOCUMENTS 4,168,476 A * 9/1979 Petrizio .......................... 323/282
4,232,363 A * 11/1980 Higuchi et al. .......................... 363/75
4,429,269 A * 1/1984 Brown .......................... 323/344
4,692,686 A * 9/1987 Thomas .......................... 323/344
5,889,666 A * 3/1999 Brand et al. .......................... 363/78

* cited by examiner

*Primary Examiner*—Matthew Nguyen
(74) *Attorney, Agent, or Firm*—Ira M. Siegel

(57) ABSTRACT

The present invention is an AC voltage regulator which includes a feed-forward circuit and a differential amplifier which continuously and instantaneously compares the incoming AC voltage to a locally generated, amplitude-stabilized wave form. The local wave form is generated substantially frequency and phase synchronized to the incoming voltage. The output of the differential amplifier drives a power amplifier. The power amplifier output is arranged to continuously buck or boost the incoming AC voltage, depending on the polarity (phase) of the signal from the differential amplifier. The system corrects even subcycle disturbances in the incoming wave form. The present invention is also a method for regulating AC voltage. In this regard, the method includes the steps of deriving a representative wave form corresponding to the incoming AC voltage, generating a reference signal substantially frequency and phase synchronized to the incoming voltage, using a differential amplifier to instantaneously and continuously generate an error signal which is proportional to the difference between the representative wave form and the reference signal, and adding the error signal to the AC voltage to create a regulated AC voltage output.

17 Claims, 6 Drawing Sheets

CONTINUOUS FEED-FORWARD AC VOLTAGE REGULATOR

BACKGROUND OF THE INVENTION

1. Field of the Invention

This invention relates to a system and method for regulating AC voltage.

2. Prior Art

The present invention relates to the regulation of the AC voltage coming into a device, a plant or even a town. While the present application is useful in many applications, the present invention has particular use in connection with regulating the voltage of AC power received from utilities or other large scale power sources.

Utility AC power is commonly supplied worldwide at nominal frequencies of 50 Hz or 60 Hz and at nominal voltages ranging from 100 volts to 250 volts RMS. Significant deviations from nominal frequency are extremely rare. However, significant voltage deviations are not so rare. Although voltage deviations are expected to some degree in any utility system, they can become large enough to cause problems in the operation of certain electrical equipment, including voltage sensitive devices such as induction motors and automated equipment. The incidence and severity of such problems tend to be greater in developing countries where quality controls on electrical power suppliers are not yet sufficiently sophisticated to prevent voltage spikes and dips. However, such problems are not by any means limited to developing countries. Operators of factories, communications facilities, hospitals and the like could find "in house" regulation of the electrical power received from electrical power suppliers to be very helpful in preventing their equipment from malfunctioning due to voltage spikes and dips.

Heretofore, the most widely used line voltage regulation systems have been the ferro-resonant type. These systems use no active electronics, yet they are expensive to build and they operate inefficiently.

Most active AC voltage regulators use a closed loop control to hold constant the output voltage. The closed loop control process requires measurement of the effective value of the output. Because the output is an AC voltage, its effective value can only be determined after an averaging or integration time. This limits the ability of the system to respond to rapid fluctuations in the incoming line voltage (i.e., the AC power received at the input of the voltage regulator). Actual correction is generally accomplished by adding a controlled in-phase voltage, to increase or "boost" the output, or an out-of-phase voltage, to decrease or "buck" the output, to the incoming line voltage. This is frequently done by switching taps on a "buck/boost" transformer or auto-transformer in response to a measurement of the output voltage and subsequent comparison of that measurement to a stable reference. The switching of taps may be accomplished with either mechanical or solid state switches. The method of regulating AC voltage with such closed loop systems is sometimes referred to as stepped regulation.

A version of this method is embodied in servo-motor driven variable auto-transformers such as a Variac® transformer from GenRad, Inc. of Westford, Mass. This prior art AC voltage regulator requires a transformer having a very large number of taps selected via a motor driven wiper.

Another prior art technique uses negative feedback. With this technique an error signal is generated by first rectifying and smoothing the output line voltage, and then comparing the smoothed, rectified output line voltage to a DC reference voltage (i.e., the error signal is the difference between the DC reference voltage and the smoothed, rectified output line voltage). This error signal is then used to modulate the amplitude and polarity (phase) of a signal which drives a power amplifier which subsequently corrects the output line voltage. The power amplifier output drives the primary coil of a transformer, the secondary voltage of which "bucks" or "boosts" the incoming line voltage. This technique regulates the output voltage in a more continuous manner than the stepped regulation system described above. However, like systems using the stepped regulation method, systems using the negative feedback technique do not regulate subcycle voltage deviations. In addition, because of delays inherent in feedback systems, damaging voltage spikes may still occur.

In another type of AC voltage regulation system using stepped regulation, analog circuitry is used to periodically sample the unregulated AC line input and create a line input representative signal, and to compare that signal to a scaled reference sine wave. The reference sine wave represents the desired output line voltage. The difference between the line input representative signal and the scaled reference sine wave is an analog error voltage signal, which is used in a feed forward manner. Digital circuitry converts the analog error voltage to an instruction command which activates a selected solid state switch, of an array of switches, associated with a tap on a multi-tap transformer connected to the system's regulated AC output line. The taps are successively located on the multi-tap transformer to provide selectable adjustment voltages of several values. The polarity of the switched-in adjustment voltage is determined by the instruction command. This adjustment voltage is applied to the primary winding of a step-up, step-down transformer, thereby applying to the transformer's secondary winding the "buck" or "boost" voltage needed to move the AC output line voltage to the desired level. This type of AC voltage regulation system is described in U.S. Pat. No. 4,429,269, issued to Johnny F. Brown. The precision of such a system is limited by the finite number of taps available for incremental voltage corrections. The speed of voltage correction is limited by the clock cycle time of the system. And, the system is burdened by relatively complex digital circuitry.

Another prior art AC voltage regulation system using a feed forward method is disclosed in an article titled "A Fast Active Power Filter to Correct Line Voltage Sags," by V. B. Bhavaraju and P. Enjeti, printed in *IEEE Transactions on Industrial Electronics*, Vol. 41, No. 3, June 1994. In this system the input line voltage is monitored by a peak voltage detector, which outputs a voltage signal which is proportional to any drop in input line voltage from the nominal input line voltage. The output of the peak voltage detector is fed to a voltage to pulse width converter, which in turn drives an AC chopper. The AC chopper is powered by an auxiliary un-interruptible power source ("UPS"). The output of the AC chopper is fed to the primary winding of a booster transformer, the secondary winding of which is connected in series with the electronic load. The secondary winding injects a suitable corrective voltage to overcome voltage sags in the input line voltage. This system does not protect electrical and electronic equipment from voltage spikes.

SUMMARY OF THE INVENTION

The present invention is an AC voltage regulator which avoids the delays and stability problems associated with negative feedback systems and the discontinuities associated with stepped regulation systems. The AC voltage regulator of the present invention includes a feed-forward circuit and a differential amplifier which continuously and instantaneously compares the incoming AC voltage to a locally generated, amplitude-stabilized wave form. The local wave form is generated substantially frequency and phase synchronized to the incoming voltage. The output of the differential amplifier drives a power amplifier. The power amplifier is arranged to continuously buck or boost the incoming AC voltage, depending on the polarity (phase) of the signal from the differential amplifier. Because the invented system continuously compares the incoming wave form to the "pure," locally generated wave form, the system corrects even subcycle disturbances in the incoming wave form.

The present invention is also a method for regulating AC voltage. In this regard, the method includes the steps of deriving a representative wave form corresponding to the incoming AC voltage, generating a reference signal substantially frequency and phase synchronized to the incoming voltage, using a differential amplifier to instantaneously and continuously compare the representative wave form to the reference signal and to generate an error signal which is proportional to the difference between the representative wave form and the reference signal, and adding the error signal to the AC voltage to create a regulated AC voltage output.

The system and method of the present invention may be realized through the use of commercially available components.

BRIEF DESCRIPTION OF THE DRAWINGS

1.

2.

3.

4.

5.

6.

DETAILED DESCRIPTION OF THE INVENTION

Figure 1:
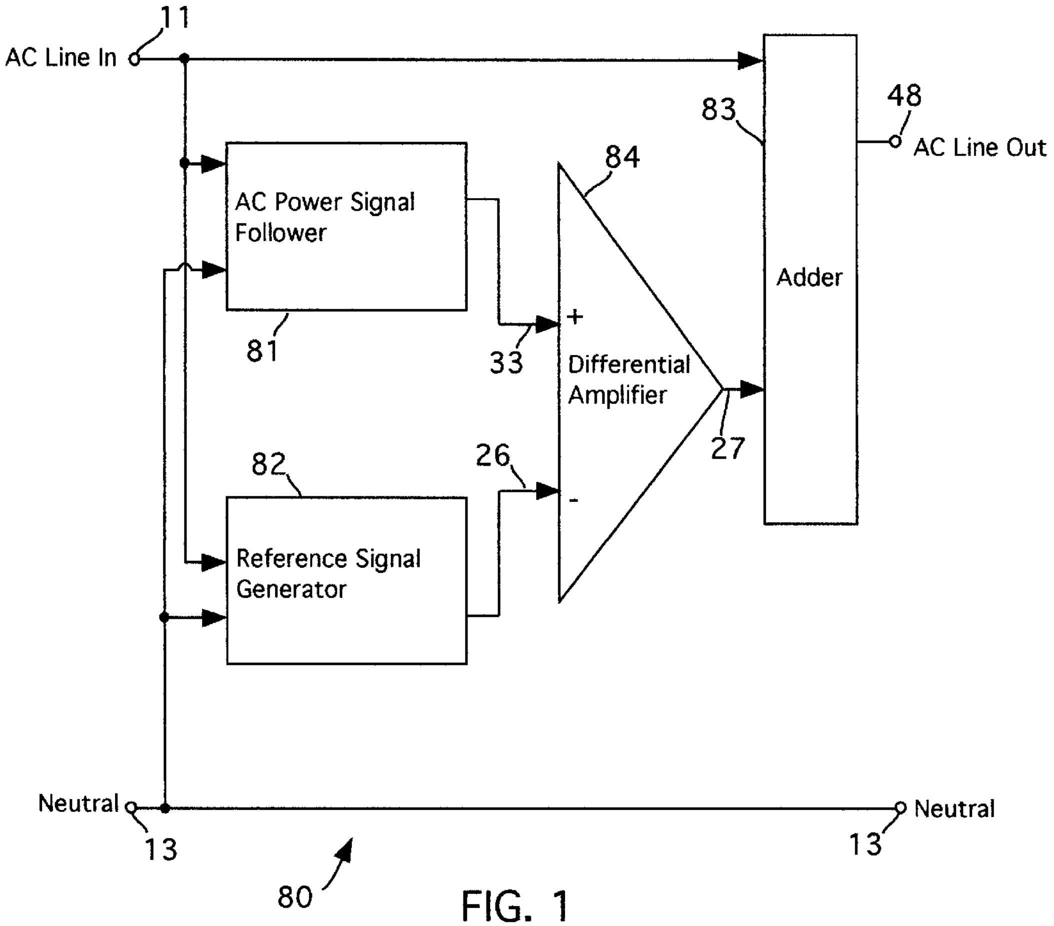
FIG. 1 is a block diagram of the invention.

The preferred embodiment of the subject invention is illustrated in the attached drawings which are referred to herein. The same reference numeral will be used to identify identical elements throughout the drawings. The subject invention may be utilized in many applications, including the regulation of AC voltage from a local generator to any device. For example, on airplanes 28 volts at 400 Hz aircraft utility power is delivered from onboard generators to various avionic devices. The present invention may be used to regulate the 28 volt line voltage. The preferred embodiments of the invention are used in connection with regulating the voltage from utility power companies, and such embodiments are described below.

Referring to FIG. 1, the AC voltage regulator 80 of the present invention includes AC power signal follower 81 which receives the incoming AC voltage which is supplied from a utility power source across regulator input 11 and neutral input 13, and which creates a representative AC signal, which is delivered to input 33 of differential amplifier 84. This representative signal is phase synchronized with the AC line voltage and is significantly reduced in voltage therefrom. The invention also includes reference signal generator 82 which also receives the AC line voltage from line input 11 and neutral input 13. The reference signal generator creates a reference AC voltage signal which is delivered to input 26 of the differential amplifier. The reference signal generator automatically matches the frequency of the reference AC voltage signal to the frequency of the AC line voltage. Differential amplifier 84 continuously compares the representative AC signal to the reference AC voltage signal and creates at its output 27 an error voltage signal which is proportional to the difference between the representative AC signal and the reference AC voltage signal. Adder 83 receives the error voltage signal. Adder 83 then amplifies the error voltage signal and adds it to the incoming AC voltage. The amplified error voltage signal boosts the incoming AC voltage when the representative AC signal is less than the reference AC voltage signal, and bucks the incoming AC voltage when the representative AC signal is greater than the reference AC voltage signal. The invention delivers the regulated AC output voltage across regulator output 48 and neutral output 13. (The neutral input and output are the same.)

Figure 2:
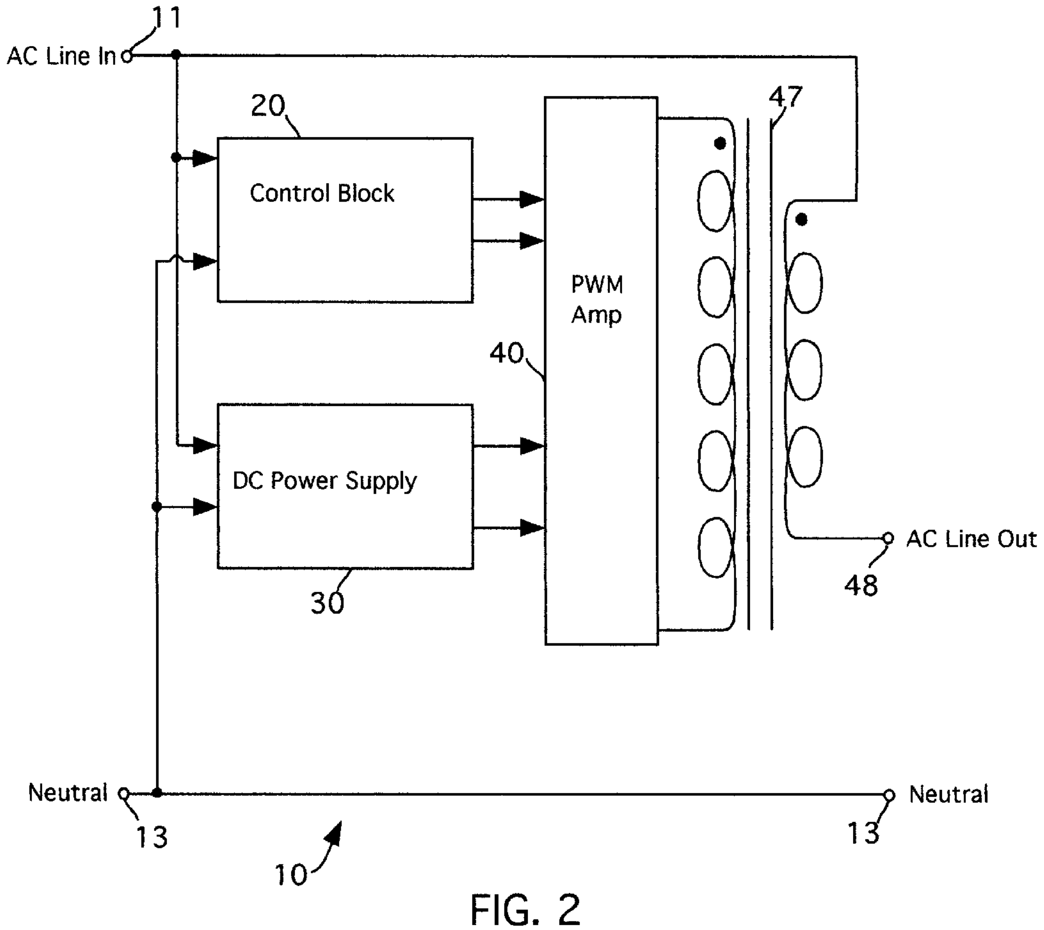
FIG. 2 is a functional block diagram of a preferred embodiment of the invention.
Figure 3:
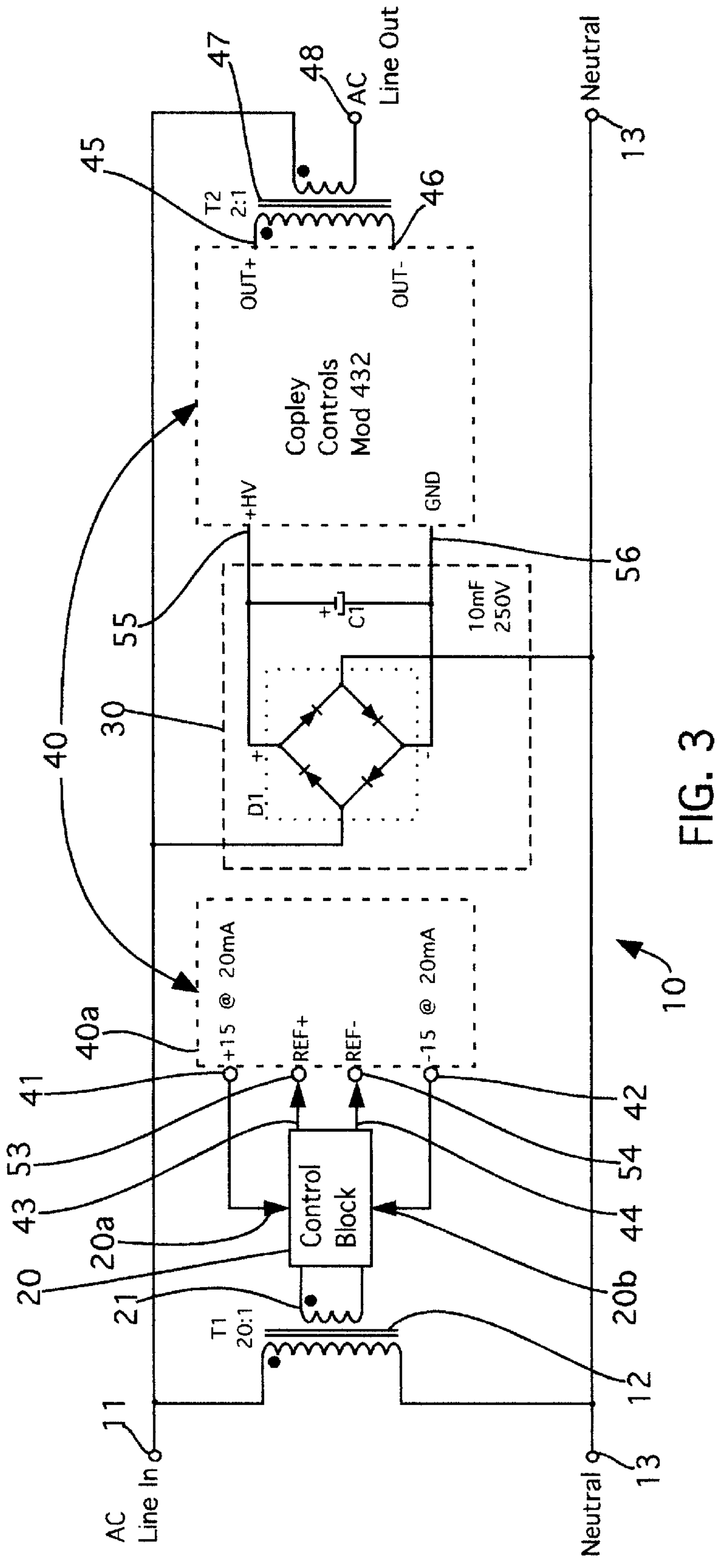
FIG. 3 is a block diagram of the system shown in FIG. 2, showing how the system's feed forward circuit (control block) is connected to the system's power supply and to the system's pulse width modulated amplifier, which in turn drives the system's buck/boost transformer.
Figure 4:
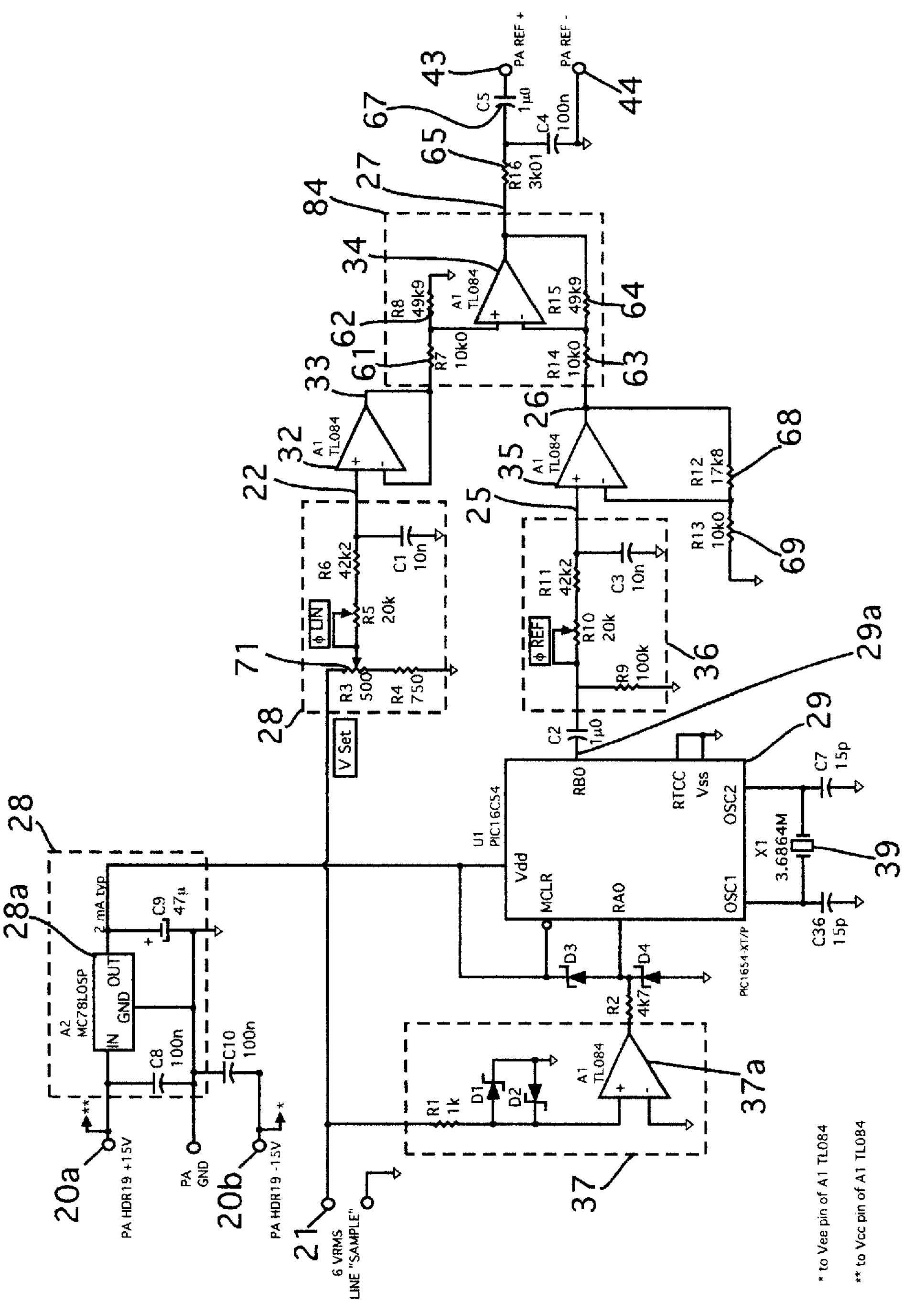
FIG. 4 is a detailed schematic of the control block.

FIGS. 2–4 illustrate a preferred embodiment 10 of the AC voltage regulator of the present invention. AC voltage regulator 10 continuously monitors the unregulated AC line voltage at line input 11 via a voltage attenuator such as 20:1 step down transformer 12 which provides a 6 volt RMS signal (when the line voltage is 120 volts RMS)-at its secondary winding. This signal is fed to control block 20. Step down transformer 12 and RC circuit 23 and operational amplifier 32 in the control block form an AC power signal follower corresponding to AC power signal follower 81 of FIG. 1. Step down transformer 12 and shaping circuit 37, micro-controller 29, RC circuit 36 and operational amplifier 35 in the control block form a reference signal generator corresponding to reference signal generator 82 of FIG. 1. Operational amplifier 34 and resistors 61, 62, 63 and 64 in the control block form a differential amplifier corresponding to differential amplifier 84 of FIG. 1.

Control block 20 is powered by the power supply section 40*a* of pulse width modulated (PWM) power amplifier 40, which delivers +15 volts DC at 20 ma from power supply output pin 41 and −15 volts DC at 20 ma from power supply output pin 42 to control block input pins 20*a* and 20*b*, respectively. The control block generates an error signal which is delivered across control block output pins 43 and 44, which are connected to positive and negative PWM power amplifier inputs 53, 54, respectively. Power amplifier 40 is a commercially available PWM power amplifier chosen for high (approximately 90%) efficiency. The inventor has found Model 432 DC brush motor PWM servo amplifier from Copley Controls Corp. of Westwood, Mass. to be an appropriate power amplifier. However, under certain conditions power amplifier 40 may consume 30% or more of the incoming AC power, most of which is added to the AC power line input via step-down transformer 47 to produce the regulated AC line output.

With reference specifically to FIG. 3, the PWM power amplifier receives DC power at its power input pins 55, 56 from power supply 30, which in the preferred embodiment is formed of a bridge rectifier and capacitor circuit. DC power to the PWM power amplifier may also be obtained from batteries or other auxiliary un-interruptible power source.

For high power loads, power factor and harmonic distortion are an increasing concern world wide. Therefore, in another embodiment 70 of the invention, illustrated in FIG. 5, power supply 30 is formed of a power factor-corrected DC power supply. The inventor has found a power factor-corrected power supply circuit similar to that shown in FIG. 19, captioned "80 W Power Factor Contoller," on the data sheet for the MC34262/MC33262 integrated circuit from Motorola, Inc. of Phoenix, Ariz., to be an appropriate power supply.

Positive and negative outputs 45, 46, respectively, of power amplifier 40 drive 2:1 transformer 47, which bucks or boosts the incoming AC line voltage depending upon the polarity (phase) of the error signals from the outputs 43, 44 of control block 20. As a result, the invention provides a continuously regulated AC output voltage at AC line out pin 48.

Since this invention essentially compares the incoming AC line voltage to a pure, locally generated AC signal, the AC voltage regulator of the present invention can correct even sub-cycle disturbances in the incoming AC line voltage. The narrowness of the sub-cycle which can be corrected is limited primarily by the bandwidth of power amplifier 40 and output transformer 47. The bandwidth of the output transformer is mainly determined by the leakage inductance allowed by the design of the transformer.

A detailed schematic of control block 20 is illustrated in FIG. 4. Control block 20 includes four operational amplifiers of common design (e.g., Model TL084 operational amplifier from Texas Instruments Incorporated of Dallas, Tex.) which receive their power from the +15 volt and −15 volt outputs of power supply section 40*a* of pulse width modulated (PWM) power amplifier 40 which are received at input pins 20*a* and 20*b*, respectively, of the control block. These operational amplifiers condition the unregulated representative signal at point 21 (i.e., the output of the secondary winding of input step down transformer 12) and compare it with an internally generated wave form. The values of the various components shown in FIG. 4 are contemplated by the inventor to be used in a typical embodiment of the invention. The embodiments of the invention illustrated herein are designed to operate over an input voltage range of approximately 85 to 135 volts RMS. Appropriate alternate components may be selected by those skilled in the art to construct embodiments of the invention which would operate over different voltage ranges.

In particular, for an American power system, the representative signal voltage at point 21 would be 6.0 volts RMS when the power input is 120 volts RMS. This signal is adjusted by RC circuit 23 such that the representative signal is 4.81 volts RMS at point 22 (the output of the RC circuit 23) when 120 volts RMS is delivered across power line input 11 and neutral 13. The representative signal at point 22 is fed to the positive input of operational amplifier 32, which is configured for unity gain. The signal at point 33 is the conditioned representative signal mentioned above which follows the line input AC signal. The signal at point 33 will vary from 5.41 volts RMS when 135 volts RMS is delivered across power line input 11 and neutral 13, to 4.81 volts RMS when 120 volts RMS is delivered across power line input 11 and neutral 13, to 3.41 volts RMS when 85 volts RMS is delivered across power line input 11 and neutral 13. As described below, the conditioned representative signal is compared to the internally generated reference voltage.

The reference signal generator in the preferred embodiment is comprised of input step down transformer 12, shaping circuit 37 (which includes operational amplifier 37*a*), micro-controller 29, RC circuit 36 and operational amplifier 35. The shaping circuit squares up the unregulated voltage sine wave received from point 21 and delivers a square wave synchronization signal at point 24 in anticipation of zero-crossing timing and automatic detection of 50 Hz or 60 Hz line frequencies by micro-controller 29. Micro-controller 29 determines whether the incoming line frequency across power line input 11 and neutral 13 is 50 Hz or 60 Hz by measuring the time period between the zero-crossings of the synchronization signal at point 24. Micro-controller 29 then automatically generates a fixed amplitude reference sine wave signal (having a 50 Hz or 60 Hz frequency matching the incoming power line frequency), through the use of a single quartz crystal 39 as a timing source for the sine-wave generator (having available frequencies of 50 Hz or 60 Hz) which is part of the micro-controller. The amplitude of the sine wave signal is predetermined based upon the micro-controller characteristics. The micro-controller contemplated by the inventor is commercially available (e.g., micro-controller part number PIC15C54 from Microchip Technology, Inc. of Chandler, Ariz.) It is programmed to generate a fixed amplitude AC reference sine wave signal, which is synchronized with the incoming line voltage, by the micro code set forth in the attached Appendix.

The micro-controller receives power from the power supply section 40*a* of PWM 40, through low current, positive voltage regulator circuit 28, the active component of which is positive voltage regulator 28*a* (e.g., model MC78L05P positive voltage regulator from Motorola, Inc.). The output of the positive voltage regulator circuit is 5.0 volts DC.

RC circuit 36 receives the fixed amplitude reference sine wave signal (nominally 1.74 volts RMS) and allows small phase adjustment of its output at point 25, in order to closely match the phase of the signal at point 22. The fixed amplitude reference sine wave signal is fed to the positive input (connected to point 25) of operational amplifier 35, which is configured, with resistors 68 and 69, for a nominal gain of 2.78 in order to produce a reference signal of 4.81 volts RMS at point 26, which point is connected to the output of operational amplifier 35. The signal at point 26 is the conditioned AC reference sine wave signal, which is the reference signal mentioned above which is compared with the conditioned representative signal.

The voltage of the reference signal at point 26 is the same as the voltage at point 33 (i.e., the voltage of the conditioned representative signal) when the power line voltage is equal to its nominal value. In practice, the reference signal channel is composed of components whose characteristics are fixed. Therefore, pot 71 is made a part of RC circuit 23 in the representative signal channel. A precision AC power source is connected to the invention and set to provide exactly 120 volts RMS. Then pot 71 is adjusted to bring the voltage at point 33 such that it is equal to the voltage at point 26 (or, alternatively, the voltage at pin 43 is zero).

As indicated above, the conditioned representative signal and the reference signal are compared to each other. This occurs at differential amplifier 84. The differential amplifier comprises operational amplifier 34 and resistors 61, 62, 63 and 64. The conditioned representative signal is fed to the non-inverting input of differential amplifier 84 (which is connected to point 33), and the reference signal is fed to the inverting input of differential amplifier 84 (which is connected to point 26). The output 27 of the differential amplifier is an error signal which tracks the differences, if any, between the conditioned representative signal and the reference signal. Representative values of the error voltage are as follows: The voltage of the error signal would be 3.0 volts RMS, in phase with the power line voltage, when the power line voltage is 135 volts RMS. The voltage of the error signal would be zero when the power line voltage is 120 volts RMS. The voltage of the error signal would be 7.0 volts RMS, out of phase with the power line voltage, when the power line voltage is 85 volts RMS.

Resistor 65 and capacitor 66 filter out spurious high frequency components of the error signal, and capacitor 67 blocks DC bias in the error signal. The error signal is then output from the control block at pins 43 and 44.

Figure 5:
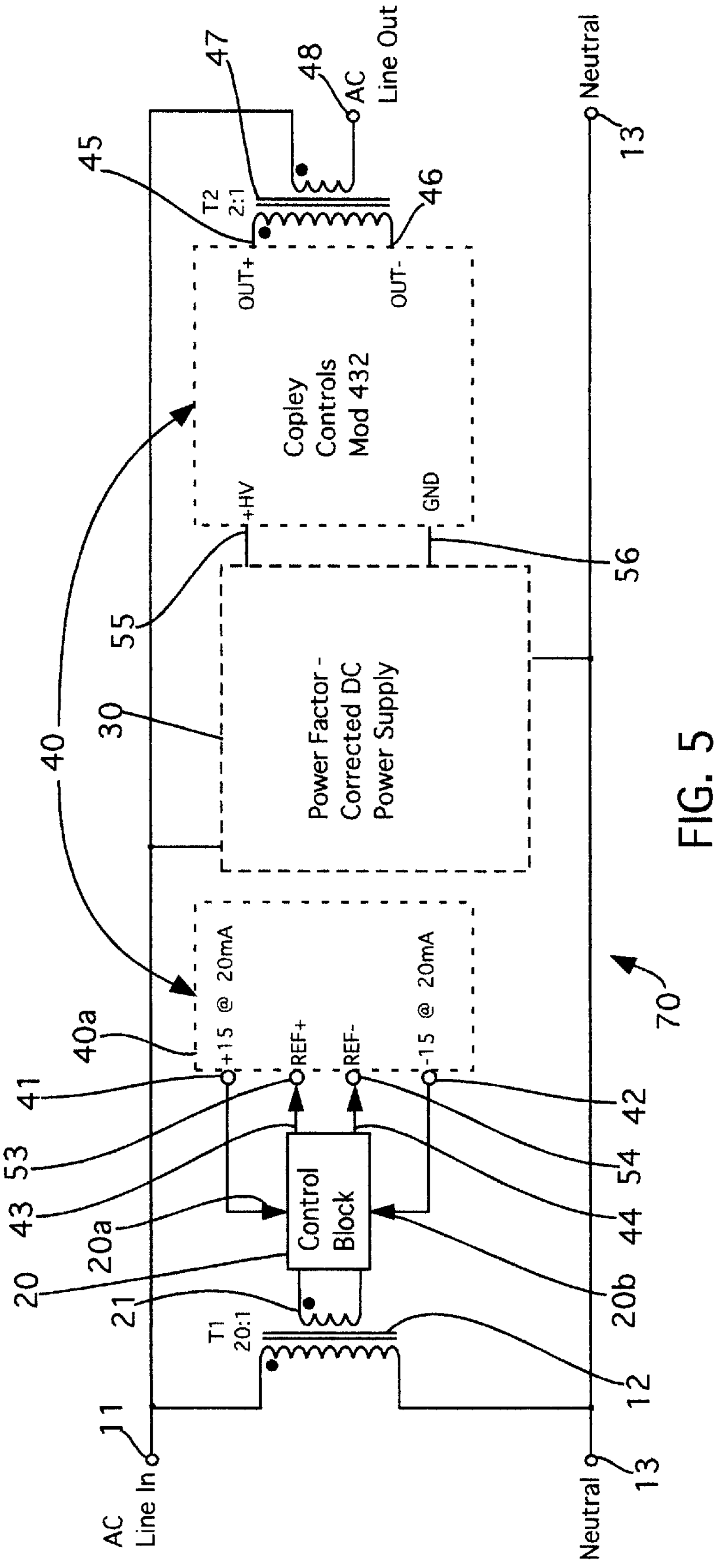
FIG. 5 is the same as FIG. 3, except that the full wave rectifier DC power supply shown in FIG. 3 is replaced by a power-factor-corrected DC power supply.
Figure 6:
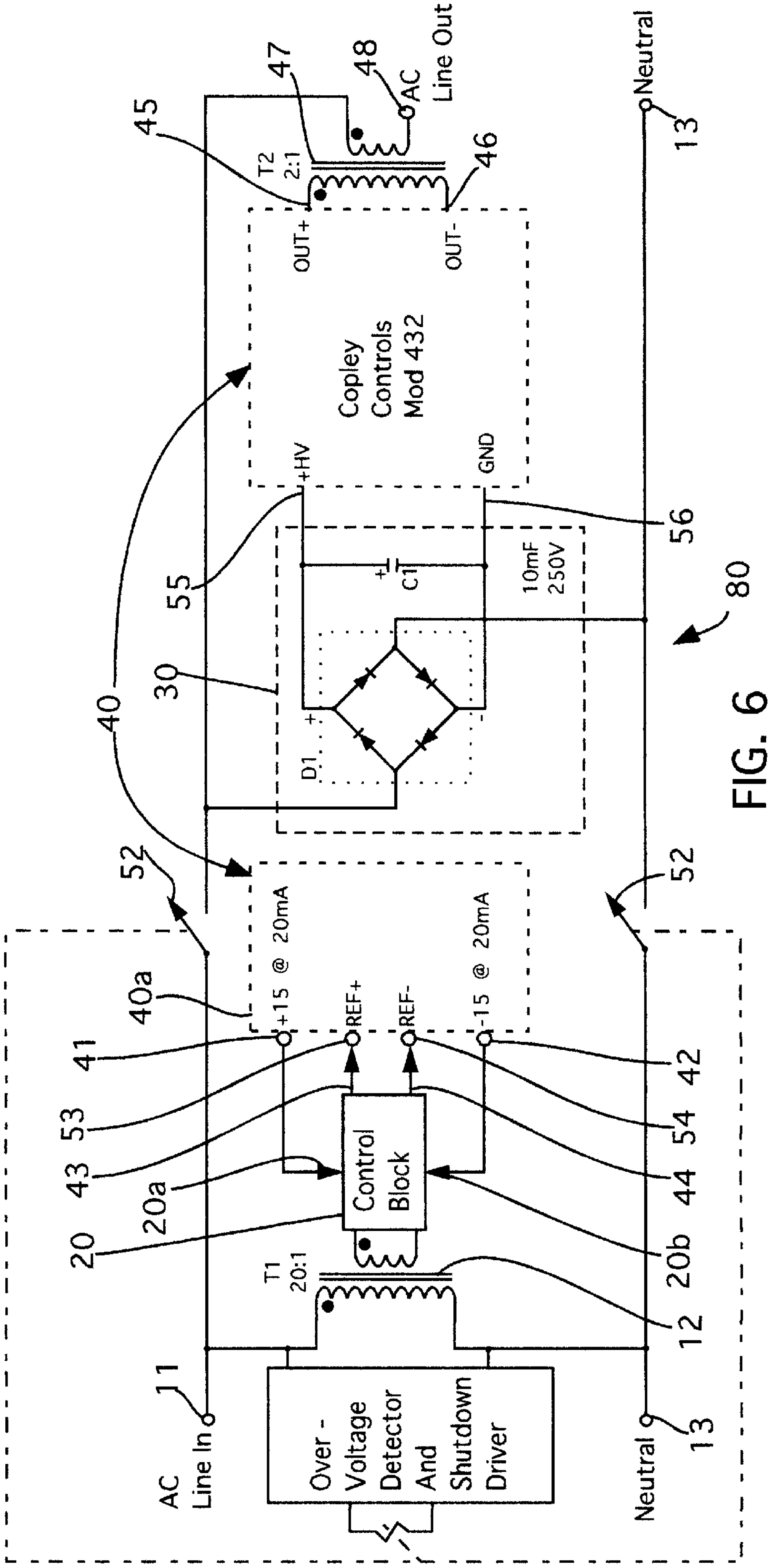
FIG. 6 is a detailed schematic of an embodiment of the invented AC voltage regulator, including an automatic overvoltage shut down circuit.

Adder 83 of FIG. 1 comprises in the preferred embodiment PWM power amplifier 40 and output step down transformer 47, shown in FIGS. 3, 5 and 6. The filtered error signal at pins 43 and 44 of the control block is delivered to pins 53 and 54, respectively, of the PWM power amplifier. The voltage gain of the PWM amplifier is set at 10. The positive and negative outputs 45 and 46, respectively, of the PWM power amplifier are connected to the primary winding of 2:1 step down transformer 47.

The control block outputs 43 and 44, the PWM power amplifier inputs 53 and 54, the PWM power amplifier outputs 45 and 46 and the output transformer are configured such that the voltage at the secondary of that transformer bucks the AC line voltage when the error signal is in phase with the AC line voltage and boosts the AC line voltage when error signal is out of phase with the AC line voltage. By way of example, when the AC line voltage is 85 volts RMS, the error signal is 7 volts RMS out of phase with the AC line voltage. The PWM amplifier amplifies the error signal to 70 volts RMS out of phase with the AC line voltage, and the output transformer steps that voltage down to 35 volts RMS, which is added to the AC line voltage such that the output of the AC voltage regulator of the present invention is 120 volts RMS.

In another embodiment of the invention, adder 83 of FIG. 1 may be realized without an output transformer.

FIG. 6 illustrates another embodiment 80 of the invention which includes an over-voltage detector and shutdown relay driver 51 and relay switches 52 connected to the incoming AC power and neutral lines. When an extreme over-voltage condition occurs which exceeds the correction capabilities of the system, switches 52 are immediately opened and the voltage regulator of the present invention precludes the AC power from being delivered to equipment connected to the regulator.

The invention may be used with three-phase AC power systems. Three voltage regulators of the present invention would be used, with each connected between neutral and a leg of the three-phase power input.

The invention also includes a method for regulating AC line voltage, which includes the following steps:

1. Continuously generating a representative signal in a feed forward circuit which follows the AC line voltage;
2. Continuously generating an AC reference signal of fixed amplitude which is substantially frequency and phase synchronized to the AC power line input;
3. Using a differential amplifier to continuously generate an error signal corresponding to the difference between the signals generated in steps 1 and 2;
4. Continuously amplifying the error signal; and continuously adding the amplified error signal to the incoming AC line voltage.

It will be understood that various changes of the details, materials, steps, arrangement of parts and uses which have been herein described and illustrated in order to explain the nature of the invention will occur to and may be made by those skilled in the art, and such changes are intended to be included within the scope of this invention. For example, it will be understood that components having different values than discussed above and/or shown in the drawings would be used in connection with power systems operating under different conditions (e.g., different voltages and frequencies) from those typically encountered in connection with American power systems. As another example, the input voltage attenuator, instead of being a transformer, could be any voltage attenuator, including a resistive voltage divider, an optically coupled isolator or an isolation amplifier. As another example, a appropriate output amplifier could eliminate the need for the output transformer. As still another example, other means besides a microprocessor could be used to generate the reference AC signal. As still another example, the PWM amplifier could be replaced with any type of power amplifier. It will also be understood that the invention may be used in connection with AC input voltage from utility power companies or from local AC generators, or from any other source of AC power.

I claim the following:

1. An AC voltage regulator comprising:

a regulator input which receives unregulated input AC voltage and a regulator output which delivers regulated AC voltage;

an AC voltage signal follower connected to the regulator input, said AC voltage signal follower delivering an AC representative signal at its output;

a reference signal generator, said reference signal generator delivering an AC reference signal at its output;

a differential amplifier receiving said AC representative signal at one of its inputs and receiving said AC reference signal at another of its inputs, said differential amplifier delivering an error signal at its output; and an adder which adds the error signal to the unregulated AC voltage and delivers regulated AC voltage to the regulator output.

2. The AC voltage regulator of claim 1, further comprising:

an error signal amplifier which receives the error signal at its input and delivers an amplified error signal at its output;

and wherein said adder adds the amplified error signal to the unregulated AC voltage and delivers regulated AC voltage to the regulator output.

3. The AC voltage regulator of claim 2 wherein said AC signal follower comprises:

a voltage attenuator which delivers at its output the AC representative signal.

4. The AC voltage regulator of claim 3 wherein said voltage attenuator is an input step down transformer.

5. The AC voltage regulator of claim 3 wherein said AC signal follower comprises:

said voltage attenuator, and a first conditioning circuit which receives the AC representative signal at its input and delivers a conditioned representative signal at its output, and wherein the differential amplifier receives the conditioned representative signal and said reference signal at its inputs.

6. The AC voltage regulator of claim 5 wherein said voltage attenuator is an input step down transformer having a step down ratio of 20:1, and the first conditioning circuit comprises an RC circuit and an operational amplifier.

7. The AC voltage regulator of claim 3 wherein said reference signal generator comprises:

a shaping circuit having its input connected to the output of said voltage attenuator and which delivers square wave synchronization signals at its output;

a micro-controller having an input connected to the output of said shaping circuit and which delivers a reference sine wave signal at its output, said reference sine wave signal having a frequency selected from a plurality of predetermined frequencies and which corresponds to the frequency of the unregulated input AC voltage;

a second conditioning circuit which receives said reference sine wave signal at its input and delivers said reference signal at its output.

8. The AC voltage regulator of claim 2 wherein said error signal amplifier is a power amplifier.

9. The AC voltage regulator of claim 3 wherein said power amplifier is a pulse width modulated power amplifier.

10. The AC voltage regulator of claim 2 wherein said adder further comprises an output transformer having its primary coil connected to the output of said error signal amplifier and having its secondary coil connected between said regulator input and said regulator output.

11. A method for regulating incoming AC voltage comprising the following steps:

a. continuously generating a representative signal in a feed forward circuit which follows incoming AC voltage;

b. continuously generating an AC reference signal having a predetermined voltage amplitude and a frequency equal to that of the incoming AC voltage;

c. using a differential amplifier to continuously generate an error signal corresponding to the difference between the signals generated in steps a and b; and d. continuously adding the error signal to the incoming AC voltage.

12. The method for regulating incoming AC voltage of claim 11, comprising the following additional step:

a. continuously amplifying the error signal;

and wherein the step of continuously adding the error signal to the incoming AC voltage is performed by continuously adding the amplified error signal to the incoming AC voltage.

13. The method for regulating incoming AC voltage of claim 11 wherein the step of continuously generating a representative signal in a feed forward circuit which follows incoming AC voltage includes the step of using a voltage attenuator to form a representation of the incoming AC voltage.

14. The method for regulating incoming AC voltage of claim 11 wherein the step of continuously generating a representative signal in a feed forward circuit which follows incoming AC voltage includes the steps of using a step down transformer to form a representation of the incoming AC voltage and passing the representation of the incoming AC voltage through an RC circuit and an operational amplifier.

15. The method of regulating incoming AC voltage of claim 11 wherein the step of continuously generating an AC reference signal includes the following steps:

passing said representation of the incoming AC voltage through a squaring circuit;

sensing the frequency of the incoming AC voltage by counting zero crossing intervals of the signal output from said squaring circuit;

selecting one of a plurality of predetermined oscillators based upon the result of the sensing step;

generating an AC sine wave signal having a predetermined voltage and a having a the frequency selected in the selection step; and conditioning said AC sine wave signal to create said AC reference signal.

16. The method for regulating incoming AC voltage of claim 15 wherein the step of continuously amplifying the error signal includes the step of using a pulse width modulated power amplifier to generate an amplified error signal.

17. The method for regulating incoming AC voltage of claim 16 wherein the step of continuously adding the amplified error signal to the incoming AC voltage includes the step of applying the amplified error signal across the primary coil of an output transformer, the secondary coil of which is connected between an input which receives the incoming unregulated AC voltage and an output which delivers regulated AC voltage.

* * * * *